D. S. SCARBOROUGH.
IGNITION LOCK.
APPLICATION FILED NOV. 22, 1918.
1,329,930. Patented Feb. 3, 1920.
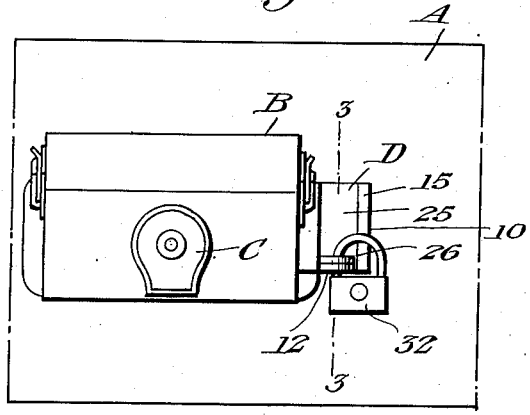
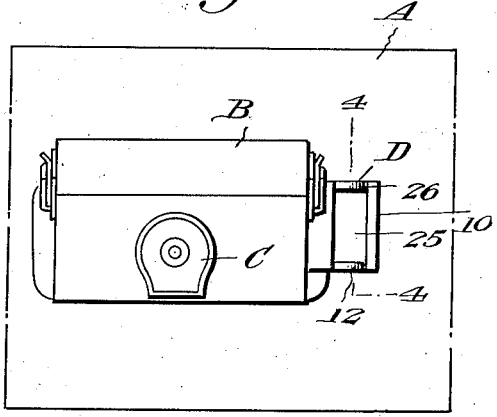
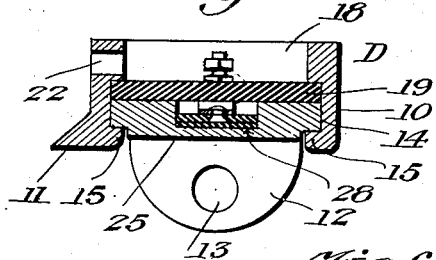
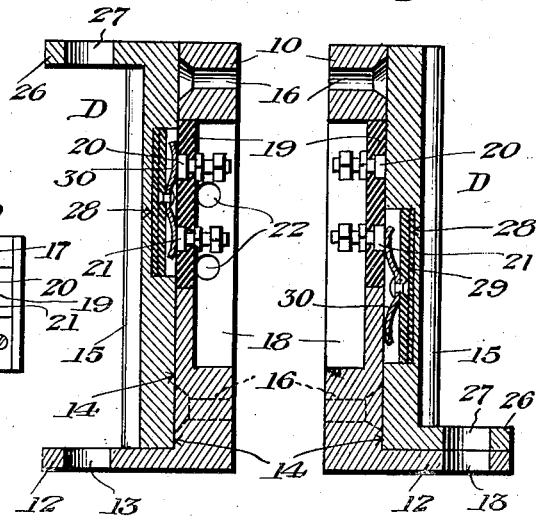
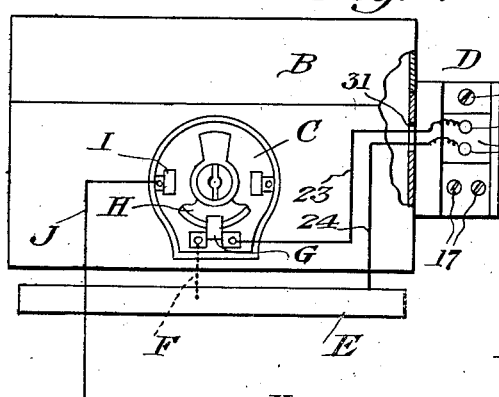
Inventor
Donald S. Scarborough
By Victor J. Evans
Attorney

UNITED STATES PATENT OFFICE.

DONALD S. SCARBOROUGH, OF ST. LOUIS, MISSOURI, ASSIGNOR OF ONE-HALF TO THOMAS WATSON, OF ST. LOUIS, MISSOURI.

IGNITION-LOCK.

1,329,930.

Specification of Letters Patent.

Patented Feb. 3, 1920.

Application filed November 22, 1918. Serial No. 263,750.

*To all whom it may concern:*

Be it known that I, DONALD S. SCARBOROUGH, a citizen of the United States, residing at St. Louis, State of Missouri, have invented new and useful Improvements in Ignition-Locks, of which the following is a specification.

This invention relates to locking devices for automobiles and has for its object the provision of a locking device adapted for association with the coil box of an automobile whereby the flow of current through the vibrator coils may be grounded so that the motor cannot be started, the device being particularly designed for the protection of automobile owners against the operations of thieves.

An important object is the provision of a locking device of this character in the nature of a switch embodying a reversible member which when in one position permits the current to pass normally through the vibrator coils and which when in another position causes the current to be grounded so that the coils will be inoperative, the device being so constructed that it may have associated therewith a padlock for holding the reversible member rigid with respect to the stationary member so that the device cannot be manipulated by anyone other than the authorized person.

A further object is the provision of a device of this character which is so constructed that it will not interfere with the operation of the ordinary switch with which this type of automobile is provided.

A further object is the provision of a locking device of this character which is of heavy construction so that it may not be broken by an ordinary blow and which is so attached to the dash of the automobile that it cannot be easily removed therefrom without involving the expenditure of considerable time and labor which would result in attracting attention to the efforts being made.

An additional object is the provision of a device of this character which may be quickly and easily installed without necessitating any material changes or alterations in the wiring within the coil box, which consists of the minimum number of parts and which will be therefore inexpensive in manufacture, and which will be highly efficient and durable in service and a general improvement in the art.

With the above and other objects and advantages in view, the invention consists in the details of construction to be hereinafter more fully described and claimed and illustrated in the accompanying drawings in which:—

Figure 1 is a front elevation of a portion of the dash of an automobile showing my device associated with the coil box, the device being in locked position.

Fig. 2 is a similar view with the device shown in unlocked position.

Fig. 3 is a longitudinal sectional view on the line 3—3 of Fig. 1.

Fig. 4 is a longitudinal sectional view on the line 4—4 of Fig. 2.

Fig. 5 is a cross sectional view and

Fig. 6 is a diagram of the wiring.

Referring more particularly to the drawings the letter A designates the dash of the vehicle, B designates the coil box and C designates the switch carried thereby.

My device is indicated as a whole by the letter D and comprises a heavy block or body 10 formed preferably of cast iron provided at one side with a laterally extending flange 11 and provided at its lower end with an outwardly extending ear 12 provided with a hole 13 for a purpose to be described. The block is recessed as shown at 14 and the side edges of the recess have formed thereon inwardly extending retaining flanges 15. The body of the block 10 is provided within the recess 14 with a plurality of holes 16 through which extend screws 17 by means of which the device is secured in position upon the dash A.

Intermediate its ends, the block 10 is provided with an opening 18 extending into the recess 14 and within this opening is secured, in any suitable manner, a block 19 of insulating material such as fiber, which carries contact members 20 and 21. The side of the block 10 adjacent the flange 11 is provided with a pair of spaced holes 22 for the passage of conducting wires 23 and 24 which are connected with the contacts 20 and 21 respectively.

The movable member of the device comprises a cast iron plate 25 slidably mounted within the recess 14 and having its side edges engageable beneath the retaining flanges 15. At one end the plate 25 is provided with an outwardly extending ear 26 provided with a hole 27 adapted to register with the hole 13 in the ear 12. At its rear side, the plate 25 is provided with a recess 28 within which is suitably secured, in any desired manner, a block 29 of insulating material upon which is secured a leaf spring 30 adapted to engage the contacts 20 and 21.

The device is installed as follows:—

The block 10 is disposed upon the dash A at one side of the coil box C in such position that the side flange 11 will bear against the side of the coil box and the block is secured in such position by means of the screws 17 which pass through the holes 16 and into the dash. As is well known, the type of coil box illustrated is provided in its bottom with a metallic strip E which is ordinarily connected by a wire F with one contact G of the switch C. This particular type of switch embodies the movable blade H constantly engaging the contact G and movable to engage a contact, I which is connected by a wire J with the magneto contact plug K.

In installing my device, I provide in the side of the coil box adjacent the locking device, a pair of holes 31 through which the wires 23 and 24 are led. In connecting my device, the usual wire F is disconnected from the contact G and is connected with the wire 24 and the wire 23 is connected with the contact G. When my protective device is in locked position, as shown in Figs. 1 and 3, the plate 25 is so disposed that the ear 26 thereby will be disposed in contact with the ear 12 on the block 10. A padlock 32 is engaged through the holes 13 and 27 for preventing movement of the plate 25. When the plate is in this position, one end of the leaf spring 30 will bear against the contact 21 and the other end of the leaf spring will contact with the back wall of the recess 14 below the block of insulation 19. It will be observed that when the parts are in this position, when the movable portion H of the switch C is moved into engagement with the contact I, as would be done in attempting to start the motor, the current passing through the vibrator coils will be grounded through the spring 30 and it will be impossible to start the motor. When the properly authorized person desires to start the motor, it is necessary first to remove the pad lock 32 and then to remove and reverse the plate 25 so that the ear 26 thereon will be disposed at the top of the locking device. When the parts are in this position, the leaf spring 30 will be so disposed that its ends will bear upon the contacts 20 and 21 and will form a bridge so that the current will flow uninterruptedly from the magneto through the switch C and to the metallic strip E upon which the vibrator coils rest.

It will be observed that this device is extremely simple in construction and installation and that its cost will therefore be reduced to the minimum. It is also apparent that the device should be and preferably is constructed from any material which will resist any ordinary blow to which it might be subjected in the attempt to break the same.

While I have shown and described the preferred embodiment of the invention, it will of course be readily understood that I reserve the right to make such changes in the form, construction and arrangement of parts as will not depart from the spirit of the invention or the scope of the subjoined claims.

I claim:—

1. A locking device of the character described comprising a relatively stationary metallic body, a pair of spaced contacts carried by and insulated from said body, a relatively movable member slidably associated with said relatively stationary member and a contact member carried by said slidable member, said slidable member being reversible whereby in one position said last named contact member will bridge said first named contact members and in its other position said last named contact member will ground one of said first named contact members upon said relatively stationary member.

2. A device of the character described comprising a metallic block, guide flanges formed thereon, an apertured ear extending from said block, a plate slidably associated with said block, and engaging beneath said flanges, an ear extending from said plate and provided with an aperture adapted to register with the aperture in said first named plate, a pair of contacts disposed within and insulated from said block, and a contact member carried by said plate, said plate being reversible whereby in one position thereof said last named contact member will bridge said first named contact members and in the other position thereof said last named contact member will ground one of said first named contact members upon said block.

3. An ignition lock adapted to be used in conjunction with the coil box of an automobile, the coil box containing a plurality of coil units, in conjunction with a switch associated with the coil box and units, comprising a metallic block provided with a recess, a pair of contacts disposed within said recess and insulated from said block, a plate slidably associated with said block and adapted to cover said recess, and a contact member carried by said plate and adapted to bridge said first named contacts when said plate is in one position, said plate being reversible whereby said last named contact member will engage one of said first named contacts and the material of said block adjacent said recess.

In testimony whereof I affix my signature.

DONALD S. SCARBOROUGH.